(12) United States Patent
Little et al.

(10) Patent No.: US 8,130,957 B2
(45) Date of Patent: *Mar. 6, 2012

(54) SYSTEM AND METHOD FOR SECURING DATA

(75) Inventors: Herbert A. Little, Waterloo (CA);
Michael K. Brown, Kitchener (CA);
Jonathan F. Hammell, Dobbinton (CA);
Michael S. Brown, Waterloo (CA);
Michael G. Kirkup, Waterloo (CA);
Neil P. Adams, Waterloo (CA)

(73) Assignee: Research In Motion Limited, Waterloo, Ontario ( * ) Notice: Subject to any disclaimer, the term of this patent is extended or adjusted under 35 U.S.C. 154(b) by 1206 days.

This patent is subject to a terminal disclaimer.

(21) Appl. No.: 10/984,331

(22) Filed: Nov. 9, 2004

(65) Prior Publication Data

US 2005/0244007 A1    Nov. 3, 2005

Related U.S. Application Data

(60) Provisional application No. 60/566,771, filed on Apr. 30, 2004.

(51) Int. Cl.
*H04K 1/00* (2006.01)
(52) U.S. Cl. ......... 380/270; 380/277; 380/247; 713/153
(58) Field of Classification Search .................. 380/270, 380/282, 277, 278, 247, 273; 713/166, 171, 713/169, 170, 153; 726/11, 12, 13
See application file for complete search history.

(56) References Cited

U.S. PATENT DOCUMENTS

| | | | | |
|---|---|---|---|---|
| 5,243,649 A | * | 9/1993 | Franson | 380/256 |
| 5,553,145 A | * | 9/1996 | Micali | 380/30 |
| 5,615,261 A | * | 3/1997 | Grube et al. | 380/2 |
| 5,892,900 A | | 4/1999 | Ginter et al. | |

(Continued)

FOREIGN PATENT DOCUMENTS

HK    HK1099863    5/2011

OTHER PUBLICATIONS

Jian et al. "CDMA physical layer built-in security enhancement" Oct. 6-9 2003, IEEE, vol. 3, pp. 2157-2161.*

(Continued)

*Primary Examiner* — David García Cervetti
(74) *Attorney, Agent, or Firm* — Schwegman, Lundberg & Woessner, P.A.

(57) ABSTRACT

In accordance with the teachings described herein, systems and methods are provided for securing data for transmission to a wireless device. The disclosed systems and methods may include an electronic messaging system used to send and receive data over a first network and also used to forward data to a wireless device operable in a second network. The electronic messaging system may receive an electronic message encrypted with a first encryption algorithm and addressed to a message recipient in the first network, the message recipient having an associated wireless device operable in the second network. The electronic messaging system may determine that the electronic message is to be transported across the second network to the wireless device, and in response to determining that the electronic message is to be transported across the second network, encrypt the electronic message using a second encryption algorithm and transmit the encrypted message over the second network to the wireless device, with the second encryption algorithm being a stronger encryption algorithm than the first encryption algorithm.

12 Claims, 8 Drawing Sheets

U.S. PATENT DOCUMENTS

| | | | | |
|---|---|---|---|---|
| 5,926,546 | A | 7/1999 | Maeda et al. | |
| 6,085,168 | A * | 7/2000 | Mori et al. | 705/17 |
| 6,401,113 | B2 * | 6/2002 | Lazaridis et al. | 709/207 |
| 6,567,914 | B1 * | 5/2003 | Just et al. | 713/160 |
| 6,580,906 | B2 * | 6/2003 | Bilgic et al. | 455/422.1 |
| 6,584,564 | B2 * | 6/2003 | Olkin et al. | 713/152 |
| 6,725,104 | B2 * | 4/2004 | Lo et al. | 700/65 |
| 6,754,470 | B2 * | 6/2004 | Hendrickson et al. | 455/67.11 |
| 6,804,707 | B1 * | 10/2004 | Ronning | 709/220 |
| 6,904,521 | B1 * | 6/2005 | Jivsov | 713/155 |
| 6,934,533 | B2 * | 8/2005 | Joyce et al. | 455/414.1 |
| 6,970,446 | B2 * | 11/2005 | Krischer et al. | 370/338 |
| 6,981,023 | B1 * | 12/2005 | Hamilton et al. | 709/206 |
| 6,988,199 | B2 * | 1/2006 | Toh et al. | 713/170 |
| 7,082,536 | B2 * | 7/2006 | Filipi-Martin et al. | 713/171 |
| 7,107,247 | B2 * | 9/2006 | Kinoshita et al. | 705/64 |
| 7,146,009 | B2 * | 12/2006 | Andivahis et al. | 380/277 |
| 7,174,368 | B2 * | 2/2007 | Ross, Jr. | 709/207 |
| 7,178,724 | B2 * | 2/2007 | Tamagno et al. | 235/380 |
| 7,196,807 | B2 * | 3/2007 | Goldstone | 358/1.15 |
| 7,243,233 | B2 * | 7/2007 | Kindberg et al. | 713/171 |
| 7,251,728 | B2 * | 7/2007 | Toh et al. | 713/156 |
| 7,254,712 | B2 * | 8/2007 | Godfrey et al. | 713/176 |
| 7,277,549 | B2 * | 10/2007 | Olkin et al. | 380/277 |
| 7,281,269 | B1 * | 10/2007 | Sievers et al. | 726/24 |
| 7,293,171 | B2 * | 11/2007 | Batthish et al. | 713/152 |
| 7,325,127 | B2 * | 1/2008 | Olkin et al. | 713/152 |
| 7,376,968 | B2 * | 5/2008 | Ritz et al. | 726/17 |
| 7,401,356 | B2 * | 7/2008 | Bandini et al. | 726/14 |
| 7,472,051 | B2 * | 12/2008 | Mariani et al. | 703/13 |
| 7,600,121 | B2 * | 10/2009 | Davin | 713/170 |
| 7,653,815 | B2 * | 1/2010 | Godfrey et al. | 713/176 |
| 7,706,528 | B2 * | 4/2010 | Futa et al. | 380/28 |
| 7,827,406 | B2 * | 11/2010 | Brown et al. | 713/170 |
| 2002/0034305 | A1 | 3/2002 | Noyama et al. | |
| 2002/0049818 | A1 * | 4/2002 | Gilhuly et al. | 709/206 |
| 2002/0053019 | A1 * | 5/2002 | Ruttan et al. | 713/152 |
| 2002/0076053 | A1 * | 6/2002 | Hachimura | 380/277 |
| 2002/0101998 | A1 | 8/2002 | Wong et al. | |
| 2002/0106079 | A1 * | 8/2002 | Mauro et al. | 380/29 |
| 2002/0112168 | A1 * | 8/2002 | Filipi-Martin et al. | 713/183 |
| 2002/0129238 | A1 * | 9/2002 | Toh et al. | 713/153 |
| 2002/0143885 | A1 * | 10/2002 | Ross, Jr. | 709/207 |
| 2002/0199096 | A1 * | 12/2002 | Wenocur et al. | 713/153 |
| 2003/0046533 | A1 * | 3/2003 | Olkin et al. | 713/152 |
| 2003/0115448 | A1 * | 6/2003 | Bouchard | 713/153 |
| 2003/0195967 | A1 * | 10/2003 | Selgas et al. | 709/228 |
| 2003/0195968 | A1 * | 10/2003 | Selgas et al. | 709/228 |
| 2003/0204606 | A1 * | 10/2003 | Selgas et al. | 709/228 |
| 2003/0233414 | A1 * | 12/2003 | Henry | 709/206 |
| 2004/0015592 | A1 * | 1/2004 | Selgas et al. | 709/228 |
| 2004/0030752 | A1 * | 2/2004 | Selgas et al. | 709/206 |
| 2004/0032624 | A1 * | 2/2004 | Stevens et al. | 358/402 |
| 2004/0053601 | A1 * | 3/2004 | Frank et al. | 455/411 |
| 2004/0196978 | A1 * | 10/2004 | Godfrey et al. | 380/270 |
| 2004/0196979 | A1 * | 10/2004 | Cheng et al. | 380/270 |
| 2005/0036622 | A1 * | 2/2005 | Hay et al. | 380/270 |
| 2005/0114652 | A1 * | 5/2005 | Swedor et al. | 713/156 |
| 2005/0114664 | A1 * | 5/2005 | Davin | 713/170 |
| 2005/0160292 | A1 * | 7/2005 | Batthish et al. | 713/201 |
| 2005/0163320 | A1 * | 7/2005 | Brown et al. | 380/270 |
| 2005/0198170 | A1 * | 9/2005 | LeMay et al. | 709/206 |
| 2005/0210246 | A1 * | 9/2005 | Faure | 713/167 |
| 2006/0031364 | A1 * | 2/2006 | Hamilton et al. | 709/206 |
| 2006/0053280 | A1 * | 3/2006 | Kittle et al. | 713/156 |
| 2006/0265498 | A1 * | 11/2006 | Turgeman et al. | 709/225 |
| 2006/0291455 | A1 * | 12/2006 | Katz et al. | 370/355 |
| 2007/0172066 | A1 * | 7/2007 | Davin | 380/262 |
| 2008/0044023 | A1 * | 2/2008 | Zorea et al. | 380/270 |
| 2008/0044029 | A1 * | 2/2008 | Gilhuly et al. | 380/278 |
| 2008/0046528 | A1 * | 2/2008 | Gilhuly et al. | 709/206 |
| 2008/0097946 | A1 * | 4/2008 | Oliver et al. | 706/46 |
| 2008/0270789 | A1 * | 10/2008 | Bandini et al. | 713/156 |
| 2009/0276626 | A1 * | 11/2009 | Lazaridis et al. | 713/168 |
| 2010/0115264 | A1 * | 5/2010 | Godfrey et al. | 713/153 |
| 2010/0124333 | A1 * | 5/2010 | Godfrey et al. | 380/270 |

OTHER PUBLICATIONS

"Motorola Now offers Advanced Encryption Standard on its Canopy Wireless Broadband Equipment" f"Electronic Commerce News" Nov. 10, 2003 vol. 8, Iss. 22; p. 1.*

International Search Report of Application No. PCT/CA2004/001938, date of mailing Mar. 11, 2005—14 pgs.

Linksys "2.4GHz 54Mbps Wireless-G Broadband Router User Guide" published 2003.

* cited by examiner

SYSTEM AND METHOD FOR SECURING DATA

This application claims the benefit of U.S. Provisional Application Ser. No. 60/566,771, filed on Apr. 30, 2004, the entire disclosure of which is incorporated herein by reference.

FIELD

The technology described in this patent document relates generally to the field of data encryption. More particularly, the patent document describes a system and method for securing data for transmission to a wireless device.

BACKGROUND

Systems for encrypting electronic messages and other data are known in this field. Often, electronic messages are transmitted over unsecured networks that are merely digitally signed or encrypted with a weak encryption algorithm, such as Triple DES. In many instances, this level of security may not be sufficient.

SUMMARY

In accordance with the teachings described herein, systems and methods are provided for securing data for transmission to a wireless device. The disclosed systems and methods may include an electronic messaging system used to send and receive data over a first network and also used to forward data to a wireless device operable in a second network. The electronic messaging system may receive an electronic message encrypted with a first encryption algorithm and addressed to a message recipient in the first network, the message recipient having an associated wireless device operable in the second network. The electronic messaging system may determine that the electronic message is to be transported across the second network to the wireless device, and in response to determining that the electronic message is to be transported across the second network, encrypt the electronic message using a second encryption algorithm and transmit the encrypted message over the second network to the wireless device, with the second encryption algorithm being a stronger encryption algorithm than the first encryption algorithm.

DETAILED DESCRIPTION

Figure 1:
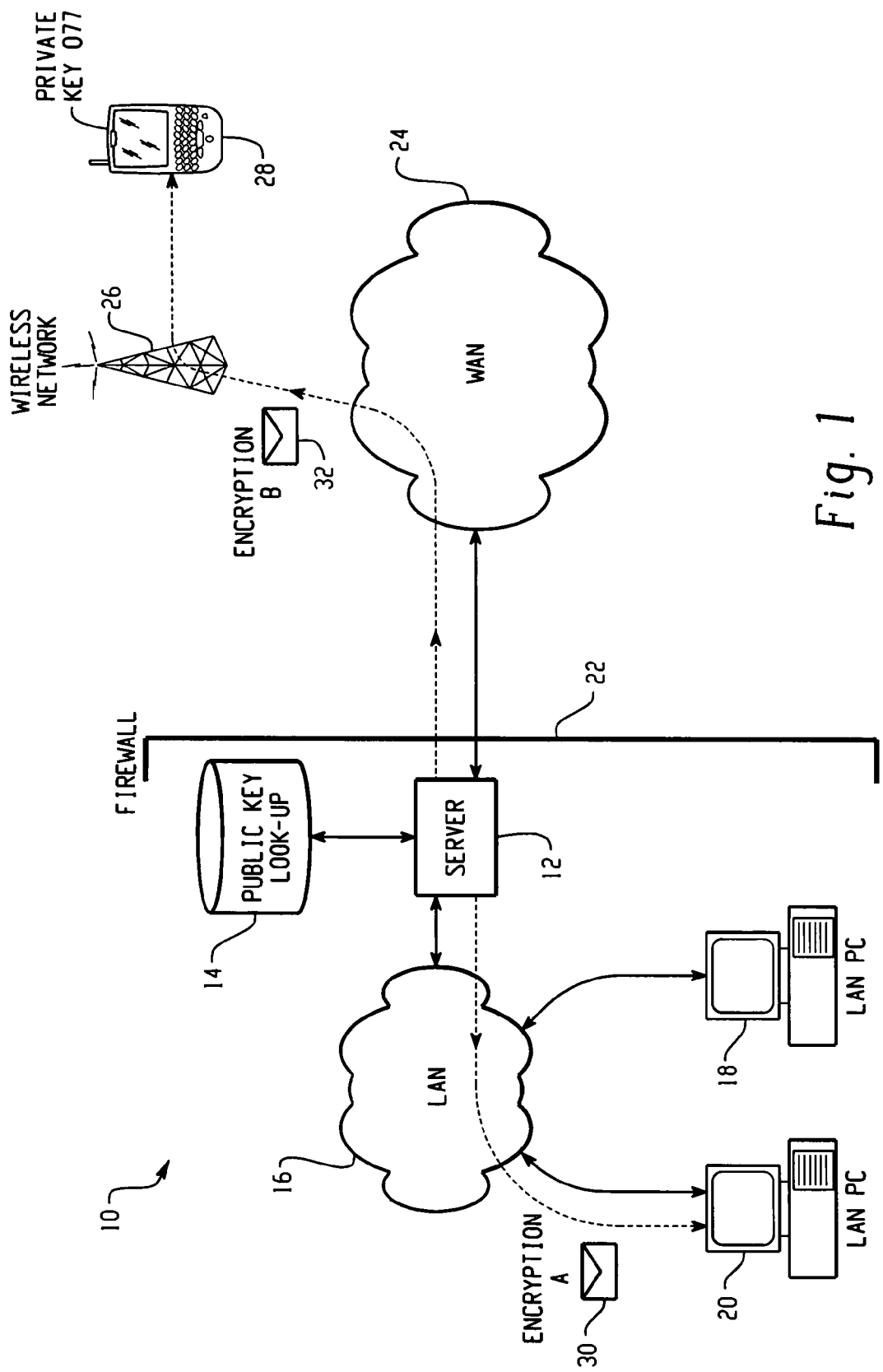
FIG. 1 is a block diagram of an example system for securing data for transmission to a wireless device.

With reference now to the drawing figures, FIG. 1 is a block diagram of an example system 10 for securing data for transmission to a wireless device 28. The system 10 includes an electronic messaging server 12, a public key look-up database 14 and a plurality of computers 18, 20 that communicate over a local area network (LAN) 16. Also illustrated are a wide area network (WAN) 24, a wireless network 26 and the wireless device 28. The system components 12, 14, 18, 20 that communicate over the LAN 16 are isolated from the WAN 24 and wireless network 26 by a firewall 22.

The electronic messaging server 12 is operable to send and receive electronic messages and other data over the LAN 16 within the protection of the firewall 22 and also outside the firewall 22 over the WAN 24. In addition, electronic messages and other data may be transmitted between the server 12 and the wireless device 28 via the WAN 24 and wireless network 26.

In operation, the system 10 uses various encryption algorithms 30, 32 to encrypt electronic messages or other data depending upon whether the data is being sent within the security of the firewall 22 or over the wireless network 26 to a wireless device 28. Messages 30 sent between computers 18, 20 on the secure LAN 16 may be encrypted with a weak encryption algorithm (Encryption A), or may be merely digitally signed or even left un-encrypted. However, if an electronic message or other data is to be transmitted outside of the security of the firewall 22 to a wireless device 28, then the electronic messaging server 12 may further encrypt the outgoing message 32 using a stronger encryption algorithm (Encryption B). This stronger encryption algorithm (Encryption B) is used to encrypt the weakly encrypted, digitally signed or unencrypted message 30, thereby providing an additional layer of protection. Preferably, the outgoing message 32 is encrypted using a strong symmetric algorithm, such as AES-256.

In order to encrypt an outgoing message 32 to the wireless device 28, the electronic messaging server 12 may access the public key look-up database 14 to identify a public encryption key for the message recipient associated with the wireless device 28. The outgoing message 32 is encrypted using a randomly generated session key and the strong symmetric encryption algorithm. The randomly generated session key used for the strong symmetric encryption is then encrypted using the public encryption key. The encrypted message 32 and the encrypted session key may then be securely transmitted over the WAN 24 and wireless network 26. The encrypted session key is then decrypted using a private encryption key stored on the wireless device 28 and is then used to decrypt the message 32. Electronic messages 32 received by the wireless device 28 may preferably be stored in encrypted format and decrypted only when accessed by application software executing on the device 28.

Figure 2:
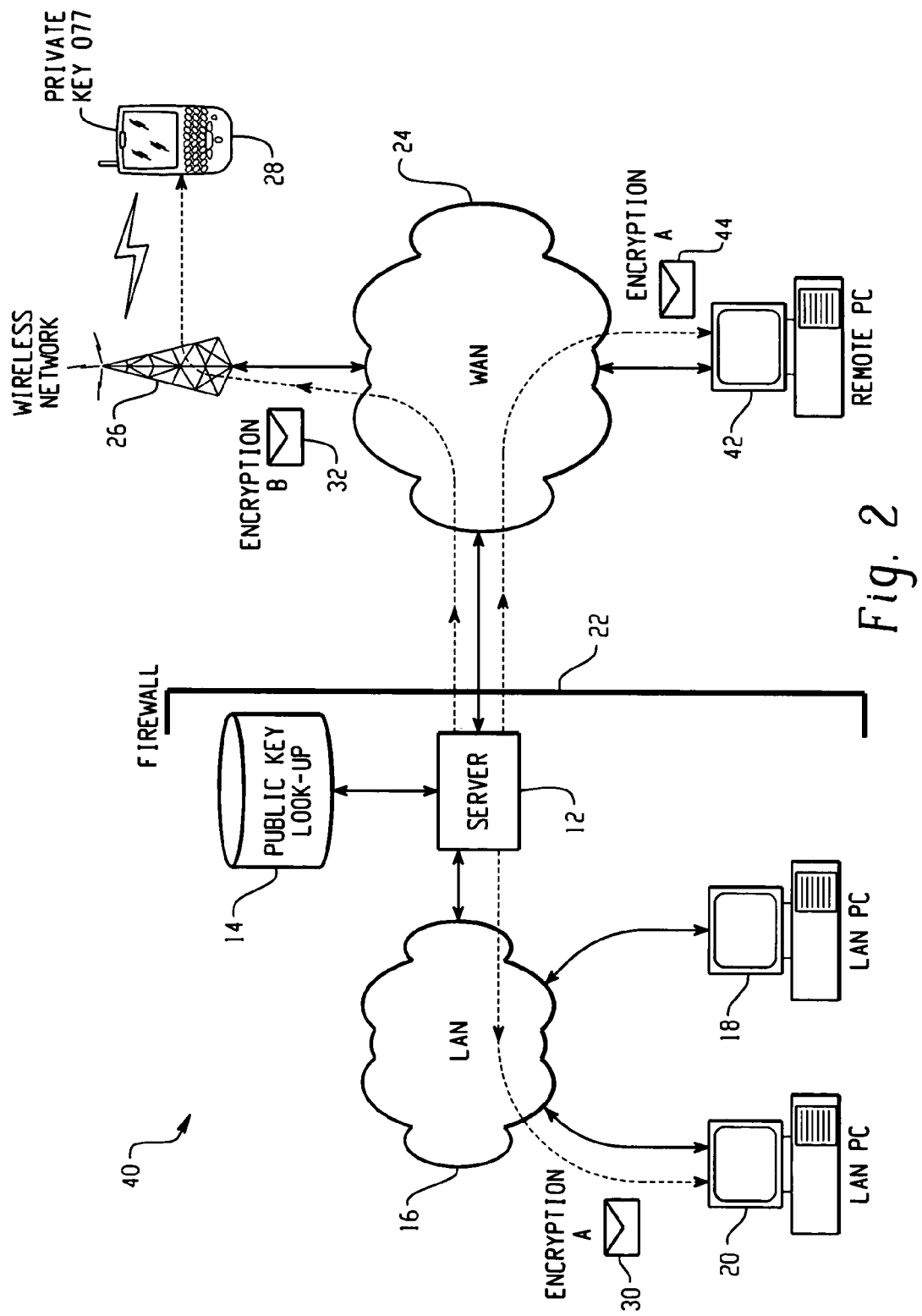
FIGS. 2 and 3 are block diagrams illustrating the transmission of data outside of the security of a firewall to a device on a wide area network (WAN)
Figure 3:
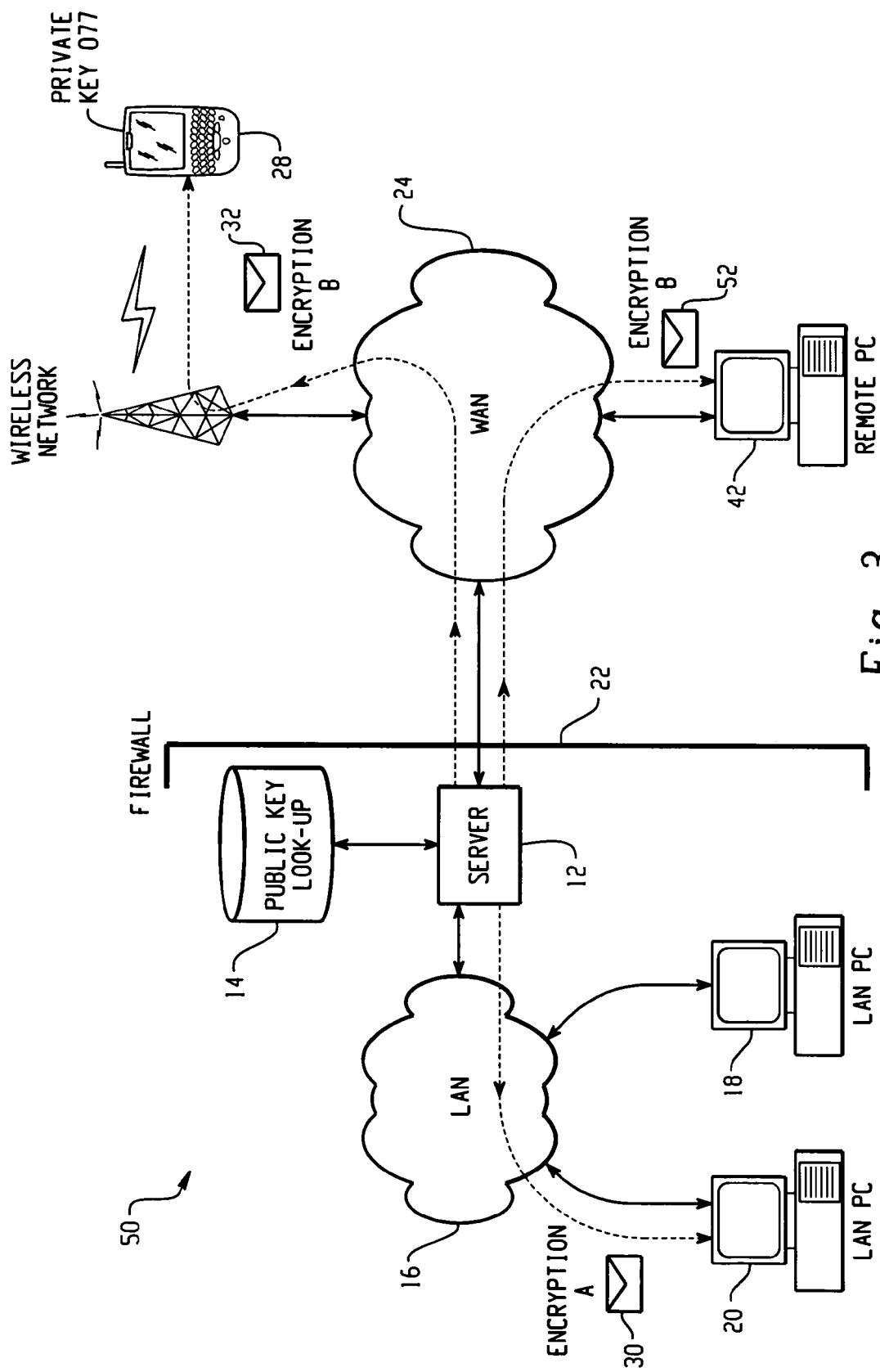

FIGS. 2 and 3 are block diagrams 40, 50 illustrating the transmission of data 44, 52 outside of the security of the firewall 22 to a device 42 on the WAN 24. As illustrated in FIG. 2, a stronger encryption algorithm (Encryption B) may be utilized when messages 32 or other data are routed over the wireless network to the wireless device 28, while a weaker algorithm (Encryption A) is utilized when messages 30, 44 are sent to devices 18, 20, 42 on the LAN 16 or WAN 24. The embodiment 40 of FIG. 2 may, for example, be implemented because security over the wireless network 26 is of greater concern than security over the WAN 24, because the software for forwarding messages 32 over the wireless network 26 is created by a different entity than the software for sending and receiving messages over the LAN 16 and WAN 24, or for other reasons. In another example embodiment illustrated in FIG. 3, the stronger encryption algorithm (Encryption B) may be utilized for all messages 32, 52 sent outside of the security of the firewall 22, while a weaker algorithm (Encryption A) is utilized only for messages 30 send over the LAN 16.

Figure 4:
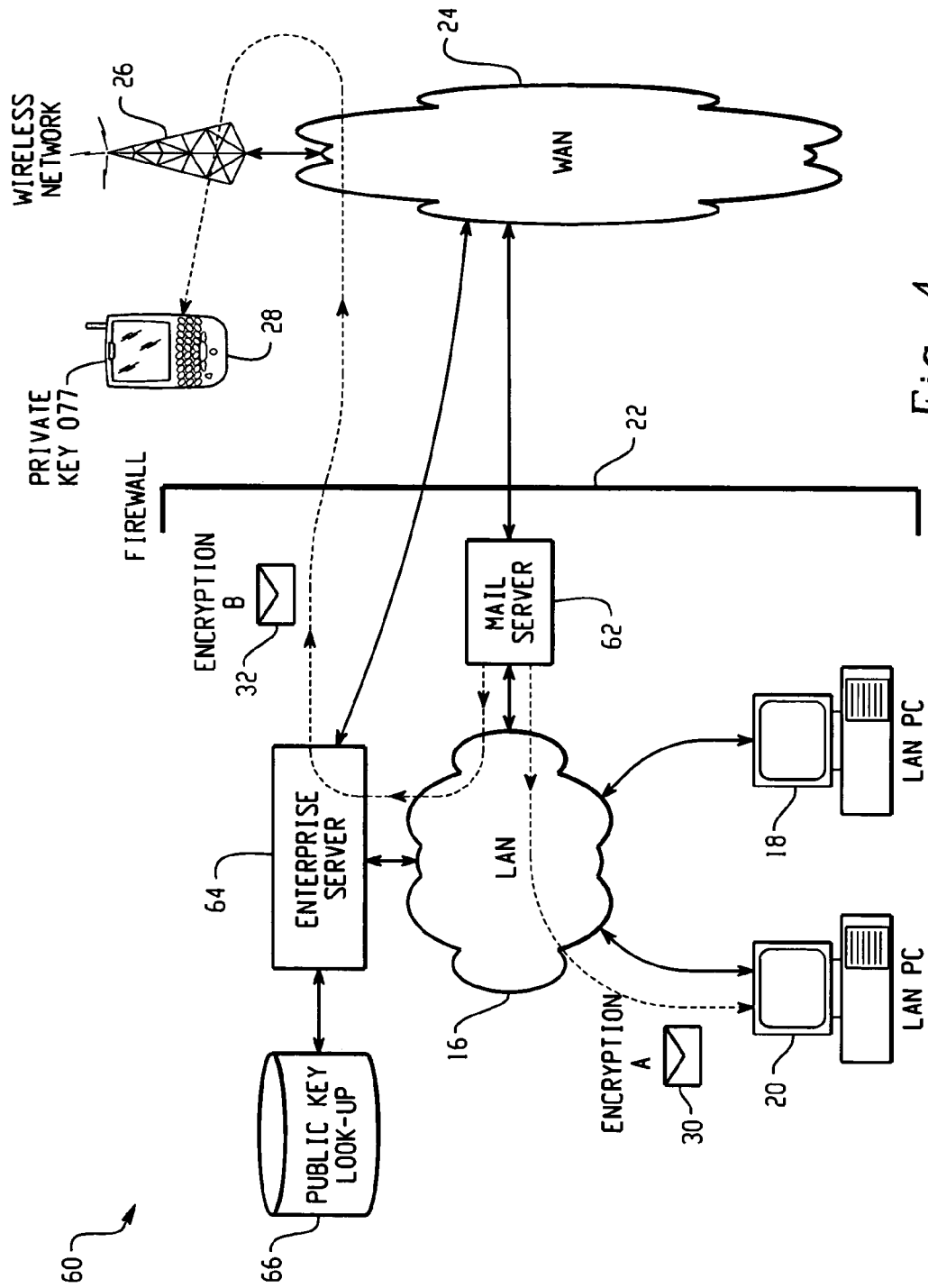
FIG. 4 is a block diagram of another example system for securing data for transmission to a wireless device.

FIG. 4 is a block diagram of another example system 70 for securing data for transmission to a wireless device 28. This system 70 is similar to the system 10 of FIG. 1, except that transmissions to and from the wireless device 28 are controlled by an enterprise server 64. An example of an enterprise server 64 is described below with reference to FIG. 7. In operation, messages 32 or other data that are received by the mail server 62 and are designated for delivery to a wireless device 28 associated with a message recipient are detected by the enterprise server 64. The enterprise server 64 then accesses the public key look-up database 66 to identify a public encryption key associated with the message recipient associated with the wireless device 28. A randomly generated session key is used to encrypt the outgoing message 32 with a stronger symmetric algorithm, such as AES-256 (e.g., instead of Triple DES.). The randomly generated session key is encrypted using the public encryption key and is then transmitted with the encrypted message 32, over the WAN 24 and wireless network 26 to the wireless device 28. The session key may then be decrypted using a private encryption key stored on the wireless device, and is then used to decrypt the message 32. Preferably, the message 32 is stored on the wireless device 28 in encrypted format, and is only decrypted when accessed by a software application executing on the device 28.

Preferably, data 32 being transmitted to the wireless device 28 may be first converted by the enterprise server 64 into a data structure that is recognized by the device 28, and then encrypted using the strong encryption algorithm (Encryption B.) The wireless device 28 may then decrypt the data structure when it receives instructions to display the data 32. In this manner, the data 32 does not have to go through a decrypt and recrypt process once it is received by the device 28.

In one embodiment, the enterprise server 64 may be further operable to distinguish between classified and unclassified messages 32, wherein only classified messages are further encrypted using the stronger encryption algorithm (Encryption B.) Unclassified messages may be encrypted using a weaker encryption algorithm (Encryption A), or may be merely digitally signed or even left un-encrypted, similar to messages 30 sent over the LAN 16. The enterprise server 64 may, for example, distinguish between classified and unclassified messages by examining one or more of the message fields (e.g., subject line, message body, etc.) for a designated keyword or keyphrase. If the designated keyword or keyphrase is identified, then the message may be treated as a classified message. In another example, the enterprise server 64 may distinguish between classified and unclassified messages based on where the message originated, for example by examining the sender field of the message. For instance, messages from an internal address (e.g., a message originating from within the firewall 22) may always be encrypted using the stronger algorithm (Encryption B), while emails from an external address may be encrypted using a weaker algorithm (Encryption A) or left unencrypted.

Figure 5:
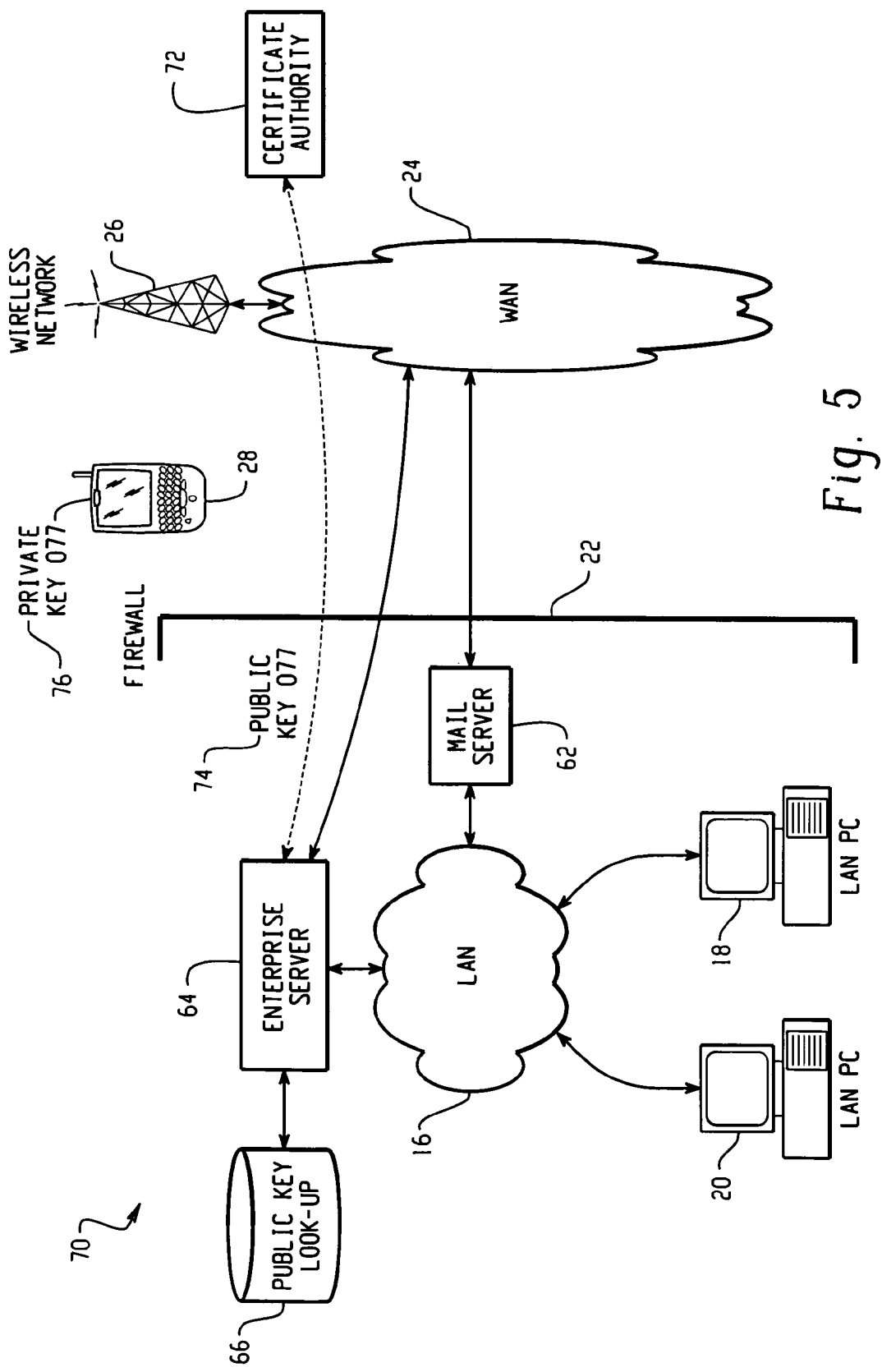
FIG. 5 is a block diagram illustrating the access of a public encryption key from a certificate authority.

As illustrated in FIG. 5, the public key 74 that is used to encrypt messages 32 outgoing to the wireless device 28 may be accessed from a certificate authority 72. The enterprise server 64 may, for example, access the certificate authority 72 over the WAN 24 to retrieve the current public key 74 for any message recipient associated with wireless devices 28 registered with the enterprise server 64. The enterprise server 64 may then store the public keys 74 in the public key look-up database 66 for quick access when encrypting an outgoing message. In another embodiment, the system 70 may not utilize a public key look-up database 66, and may instead store the public keys 74 on the enterprise server 64 or access the certificate authority 72 for the public key 74 each time the public key 74 is needed.

Figure 6:
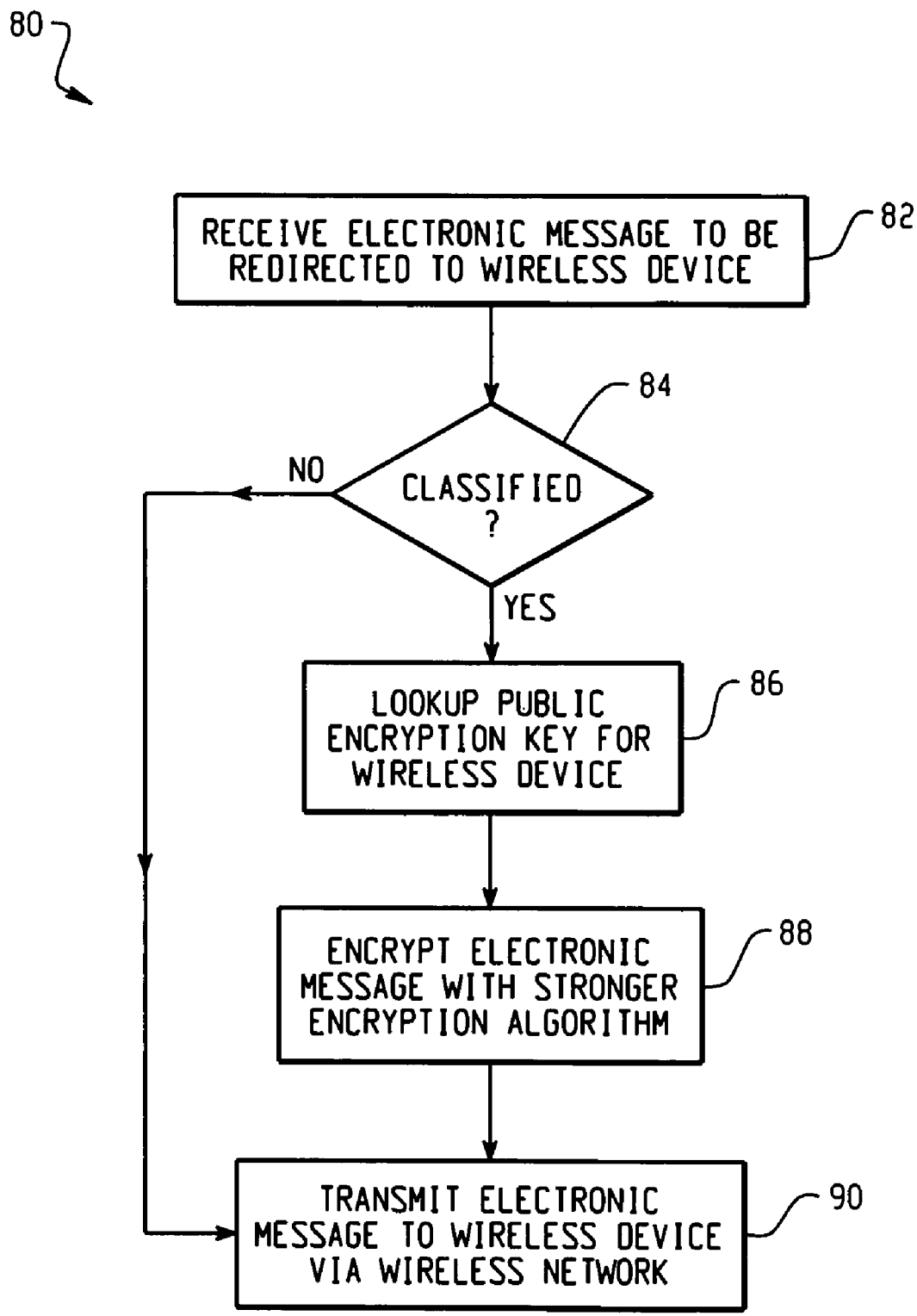
FIG. 6 is a flow diagram illustrating an example method for securing data for transmission to a wireless device.

FIG. 6 is a flow diagram 80 illustrating an example method 80 for securing data for transmission to a wireless device. The method 80 begins at step 82 when an electronic message or other data is received which is designated for delivery to a message recipient associated with a wireless device. In step 84, the method 80 determines if the received message is classified, as described above. If the message is not classified, then the method proceeds to step 90. Otherwise, if the message is classified, then the method 80 identifies the public encryption key associated with the message recipient at step 86. Then, the public encryption key is used at step 88 to encrypt a session key used by a stronger encryption algorithm to encrypt the outgoing message, as described above. At step 90, the message is transmitted to the wireless device over the wireless network.

Figure 7:
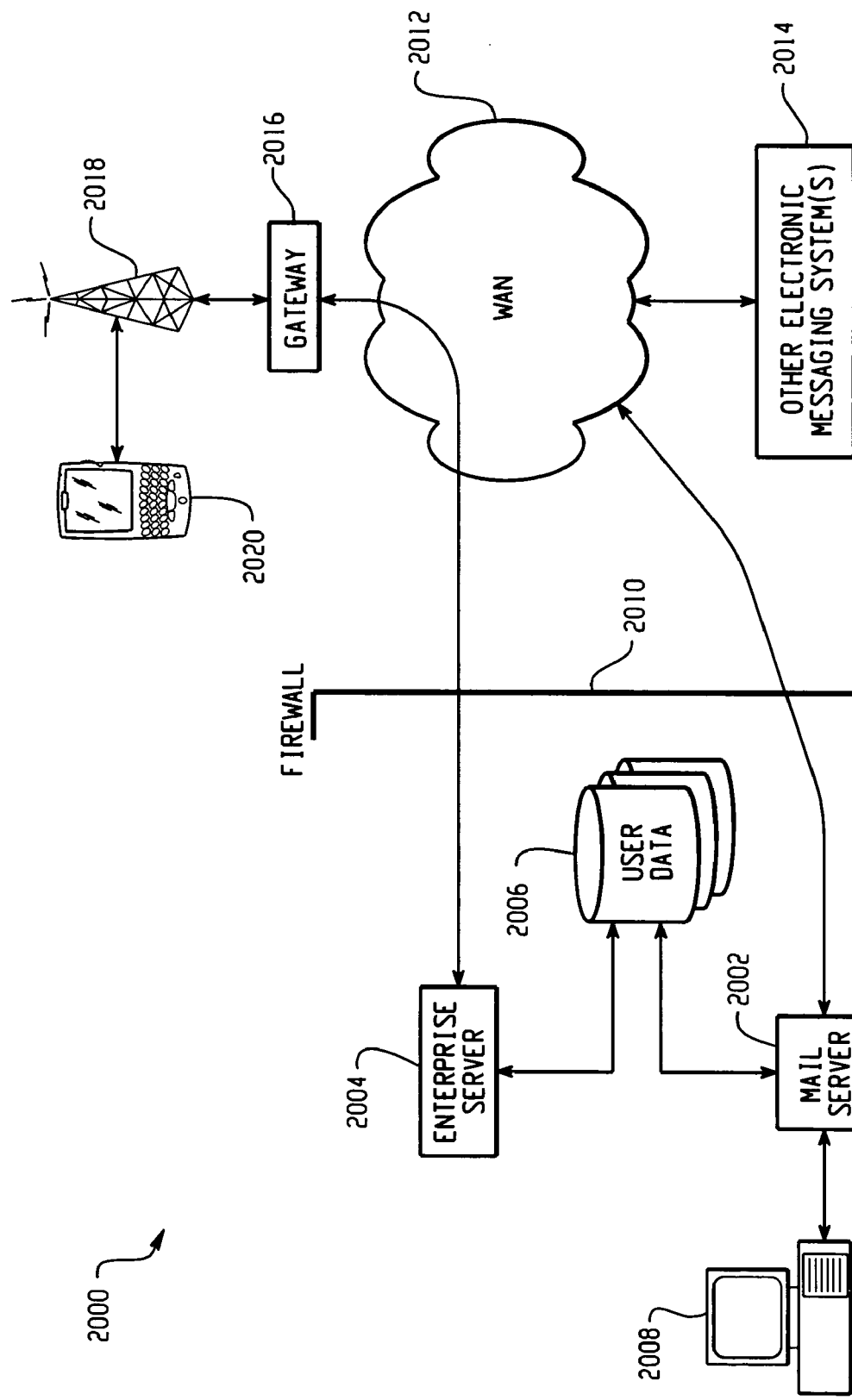
FIG. 7 is a block diagram of an example system for redirecting electronic messages or other data to and from a wireless device.

FIG. 7 is a block diagram of an example system for redirecting electronic messages or other data to and from a wireless device 2020. The example redirection system 2000 includes an enterprise server 2004, a mail server 2002, a storage medium 2006 for electronic messaging (e.g., e-mail) account data, and a wireless gateway 2016. Also illustrated are the wireless device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic message addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the wireless device 2020 and to place messages sent from the wireless device 2020 into the electronic message account 2006 for delivery by the mail server 2002. The enterprise server 2004 stores wireless device information, such as a wireless identification (e.g., a PIN), used to communicate with the wireless device 2020. The enterprise server 2004 may, for example, communicate with the wireless device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary wireless device information are sent over the WAN 2012 to the wireless gateway 2016. For example, the enterprise server 2004 may encapsulate a copy of the message into one or more data packets along with a wireless identification (e.g., a PIN) for the wireless device 2020, and transmit the data packet(s) to the wireless gateway 2016 over a direct TCP/IP level connection. The wireless gateway 2016 may then use the wireless identification and/or other wireless device information to transmit the data packets (s) containing the electronic message over the wireless network 2018 to the wireless device 2020.

Electronic messages sent from the wireless device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the wireless device 2020. For instance, an electronic message to be redirected to the wireless device 2020 may be encrypted and compressed by the enterprise server 2004, and the encrypted message may then be encapsulated into one or more data packets for delivery to the wireless device 2020. To maintain security, the electronic message may remain encrypted over the entire communication path 2016, 2018, 2012 from the enterprise server 2004 to the wireless device 2020. Similarly, electronic messages sent from the wireless device 2020 may be encrypted and compressed by the wireless device 2020 before being packetized and transmitted to the enterprise server 2004, and may remain encrypted over the entire communication path 2016, 2018, 2012 from the wireless device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 8:
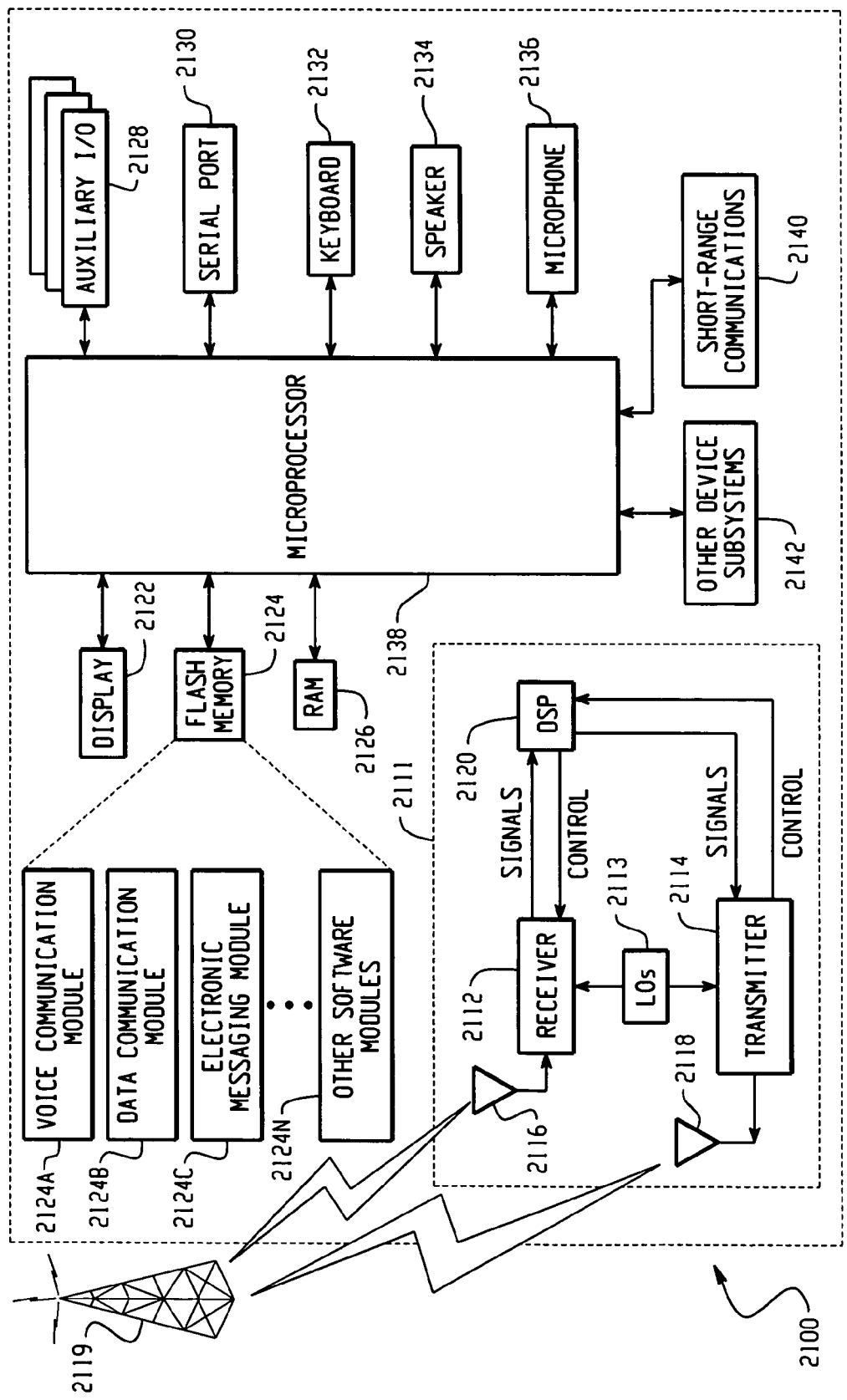
FIG. 8 is a block diagram illustrating an example wireless device.

FIG. 8 is a block diagram illustrating an example wireless device 2100. The wireless device 2100 includes a processing subsystem 2138, a communications subsystem 2111, a short-range communications subsystem 2140, a memory subsystem 2124, 2126, and various other device subsystems and/or software modules 2142. The wireless device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the wireless device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the wireless device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the wireless device 2100 is intended to operate. For example, a wireless device 2100 may include a communication subsystem 2111 designed to operate within the Mobitex™ wireless system, the DataTAC™ wireless system, a GSM network, a GPRS network, a UMTS network, and/or an EDGE network.

Network access requirements vary depending upon the type of communication system. For example, in the Mobitex and DataTAC networks, wireless devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the wireless device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the wireless device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

It is claimed:

1. In an electronic messaging system operable to send and receive electronic messages over a wired local area network and also operable to redirect electronic messages over a wireless network to a wireless device, a method of encrypting electronic messages comprising:
    an enterprise server receiving an electronic message from an electronic messaging server, wherein the electronic message is protected by a first encryption algorithm and addressed to a message recipient in the wired local area network, the message recipient having an associated wireless device operable in the wireless network, the enterprise server having wireless device identification information of the associated wireless device stored therein for use in communicating with the wireless device using a higher-level connection with a wireless gateway that provides an interface with the wireless network;
    determining that the electronic message is to be transported across the wireless network to the wireless device; and
    the enterprise server retrieving a public key from a public key look-up database that is associated with the wireless device and also generating a random session key,
    wherein in response to determining that the electronic message is to be transported across the wireless network to the wireless device, the method further comprises the enterprise server:
    converting the protected electronic message to a data structure recognizable by the wireless device;
    using the random session key to encrypt the data structure with a second encryption algorithm and using the public key to encrypt the random session key, the second encryption algorithm being a stronger security method than the first encryption algorithm;
    encapsulating the encrypted data structure and the encrypted random session key into one or more data packets along with the wireless identification information; and
    transmitting the data packets over the higher-level connection to the gateway,
    wherein the transmitted encapsulated data structure is protected with first encryption algorithm and encrypted with the second encryption algorithm.

2. The method of claim 1, wherein the second encryption algorithm is a symmetric algorithm,
    wherein the gateway is configured to utilize the wireless device identification information to transmit the data packets containing the electronic message over the wireless network to the associated wireless device, and
    wherein the associated wireless device receiving the data packets is configured to refrain from decrypting the data structure until instructions to display the message are received.

3. The method of claim 2, wherein the second encryption algorithm is an advanced encryption standard-256 (AES-256) encryption algorithm.

4. The method of claim 1, wherein one of the first encryption algorithm is a triple data encryption standard (DES) encryption algorithm.

5. The method of claim 1, wherein the public key is received from a certificate authority.

6. The method of claim 1, further comprising:
    decrypting the electronic message on the associated device using a private encryption key.

7. The method of claim 1, wherein the encrypted data structure is stored on the wireless device in encrypted form, and
    wherein the wireless device is configured to refrain from decrypting the stored encrypted data structure until accessed by an electronic messaging application.

8. The method of claim 1, further comprising:
    determining if the electronic message received by the enterprise server is a classified message or an unclassified message; and
    encrypting the data structure using the second encryption algorithm only if the received electronic message is a classified message.

9. In an electronic messaging system having an electronic messaging server that is operable to send and receive data over a wired local area network (wired-LAN) and over a wired wide area network (wired-WAN), wherein the electronic messaging server and the wired-LAN are isolated from the wired-WAN by a firewall, a system for securing data for transmission to a wireless device, comprising:

a public key look-up database for storing public encryption keys associated with a plurality of wireless devices;

an enterprise server operable to forward electronic messages from the electronic messaging server over a wireless network to the wireless device, the wireless network being less secure when compared to transmissions within the wired-LAN;

the enterprise server being further operable to:

receive an electronic message from the electronic messaging system that is protected by a first encryption algorithm and addressed to a message recipient in the wired local area network, the message recipient having an associated wireless device operable in the wireless network, the enterprise server having wireless device identification information of the associated wireless device stored therein for use in communicating with the wireless device using a higher-level connection with a wireless gateway that provides an interface with the wireless network;

determine that the electronic message is to be transported across the wireless network to the wireless device; and retrieve a public key from a public key look-up database that is associated with the wireless device and generate a random session key, wherein in response to a determination that the electronic message is to be transported across the wireless network to the wireless device, the enterprise server is further operable to:

convert the protected electronic message to a data structure recognizable by the wireless device;

using the random session key to encrypt the data structure with a second encryption algorithm and use the public key to encrypt the random session key, the second encryption algorithm being a stronger security method than the first encryption algorithm;

encapsulate the encrypted data structure and the encrypted random session key into one or more data packets along with the wireless identification information; and forward the data packets for transmission over the higher-level connection to the gateway, wherein the transmitted encapsulated data structure is protected with the first encryption algorithm and encrypted with the second encryption algorithm.

10. The system of claim 9, wherein the second encryption algorithm is a symmetric algorithm.

11. The system of claim 10, wherein the second encryption algorithm is an advanced encryption standard (AES-256) encryption algorithm.

12. The system of claim 9, wherein the enterprise server is further operable to communicate with a certificate authority over the WAN to negotiate the public key for the wireless device and to store the public key in the public key look-up database.

* * * * *